Fig-8-

United States Patent Office 3,386,540
Patented June 4, 1968

3,386,540
TRANSMISSION AND CONTROL SYSTEM THEREFOR
Joachim Horsch and Hugh C. Morris, Peoria, Shairyl I. Pearce, East Peoria, and Gerald D. Rohweder, Peoria, Ill., assignors to Caterpillar Tractor Co., Peoria, Ill., a corporation of California
Filed Jan. 18, 1966, Ser. No. 521,320
28 Claims. (Cl. 192—.09)

ABSTRACT OF THE DISCLOSURE

A multispeed transmission and control system combination including a selectively engagable torque converter and hydrodynamic retarder, the control system selectively engaging the multispeed transmission in each selected condition of operation by separate drive establishing means and including separate means for modulating the fluid pressure rise in one drive establishing means at a rate different than the other drive establishing means wherein the hydrodynamic retarder is positioned between the engine driven shaft and torque converter.

---

This invention relates to a transmission and control system therefor and more particularly relates to a variable speed transmission drive train having control means for selectively shifting it into a reverse, neutral or one of a plurality of forward speed conditions of operation. A torque converter and hydrodynamic retarder are arranged to be engaged in the drive train selectively, during certain phases of vehicle operation.

A large number of transmission drive trains and attendant control systems have been proposed for the purpose of selectively moving a vehicle, such as large earth moving machinery. It is desirable that such arrangements exhibit a high degree of structural integrity, efficiently operate in a wide variety of environments and adapt themselves for expeditious servicing. When a multi-speed gear assembly is employed therein, it is further desirable to effect a smooth and uncomplicated shift to change from one condition of operation to another by providing a control system for precisely controlling the rise of fluid pressure in the clutch or brake utilized to effect such change. The addition of a torque converter or hydrodynamic retarder to the transmission drive train, during selected conditions of vehicle operation, complicate the problems of providing an arrangement to achieve the above, briefly mentioned desiderata.

A number of novel arrangements and functions are afforded by the transmission drive train and attendant control system of this invention. The specific embodiment hereinafter disclosed comprises a drive train arranged to be connected to the engine's power output and transfer such power to a vehicle's ground engaging wheels. A retarder is arranged between the engine output and a multi-speed gear assembly of the transmission. A torque converter is arranged to also be engaged selectively in the drive train during certain phases of vehicle operation.

When the transmission is placed in a gear other than neutral, a load drive establishing means and a rear drive establishing means are actuated to drive the vehicle. The control system affords a separate fluid pressure modulation for engagement of the load and rear drive establishing means, so that they may share in the absorption of the inertia loads generated in the transmission at the start of a shift with all remaining load thereafter being absorbed by the load drive establishing means. Certain valve arrangements employed in the control system further aid in controlling the clutch or brake pressures to effect a smooth and uncomplicated manual shift.

When the torque converter is engaged in the transmission, a higher maximum pressure level is applied to the drive establishing means thereof than when the transmission is placed in a pure mechanical drive. This feature is desirable since in converter drive the torque requirements on the drive establishing means are higher than those in mechanical drive. Among the other novel aspects hereinafter presented are a safety means for preventing the vehicle from being set in motion when the engine is started in gear which also allows improved cold starting by reducing to a minimum transmission losses, control valve means for modulating precisely the fluid pressure in the selected drive establishing means as well as in the torque converter, shut-off valve means for automatically disengaging the hydrodynamic retarder from the transmission drive train during a shift and an efficient hydrodynamic control system for selectively engaging the hydrodynamic retarder in the transmission drive train.

An object of this invention is to provide a transmission drive train and control system therefor which exhibits a high degree of structural integrity, is arranged to operate efficiently in a wide variety of environments, adapts itself for expeditious servicing and is economical and compact in its structural arrangement.

Another object of this invention is to provide a transmission drive train wherein a hydrodynamic retarder may be engaged selectively between a power outlet of the engine and a multi-speed gear assembly.

A further object of this invention is to provide a control system for a multi-speed transmission wherein two drive establishing means are engaged to move the vehicle and means for affording a separate fluid pressure modulation from each of the drive establishing means.

Another object of this invention is to provide a multi-speed transmission arranged to have a torque converter engaged therein selectively and control means for affording a higher maximum pressure level when a shift is made to a torque converter drive than when a shift is made to a mechanical drive.

Another object of this invention is to provide a multi-speed transmission and control system therefor comprising a safety means for preventing a vehicle from being set in motion when the engine is started in gear.

Another object of this invention is to provide a control system for a hydrodynamic retarder which is efficient in operation and may be disconnected automatically from its associated transmission drive train during a transmission shift.

Another object of this invention is to provide an integrated hydrodynamic retarder, torque converter, and heat exchanger arrangement comprising a control valve means arranged to selectively communicate the heat exchanger with the torque converter and hydrodynamic retarder or with the converter only and means for lubricating the retarder when the heat exchanger is communicated with the torque converter.

Another object of this invention is to provide a hydrodynamic retarder arrangement comprising control valve means for cooling fluid contained therein efficiently.

Another object of this invention is to provide a control system for a hydrodynamic retarder arranged to arbitrarily regulate the power absorption capacity of the retarder.

Further and more specific objects of this invention will be apparent in the following description and drawings wherein.

Transmission drive train

Figure 1:
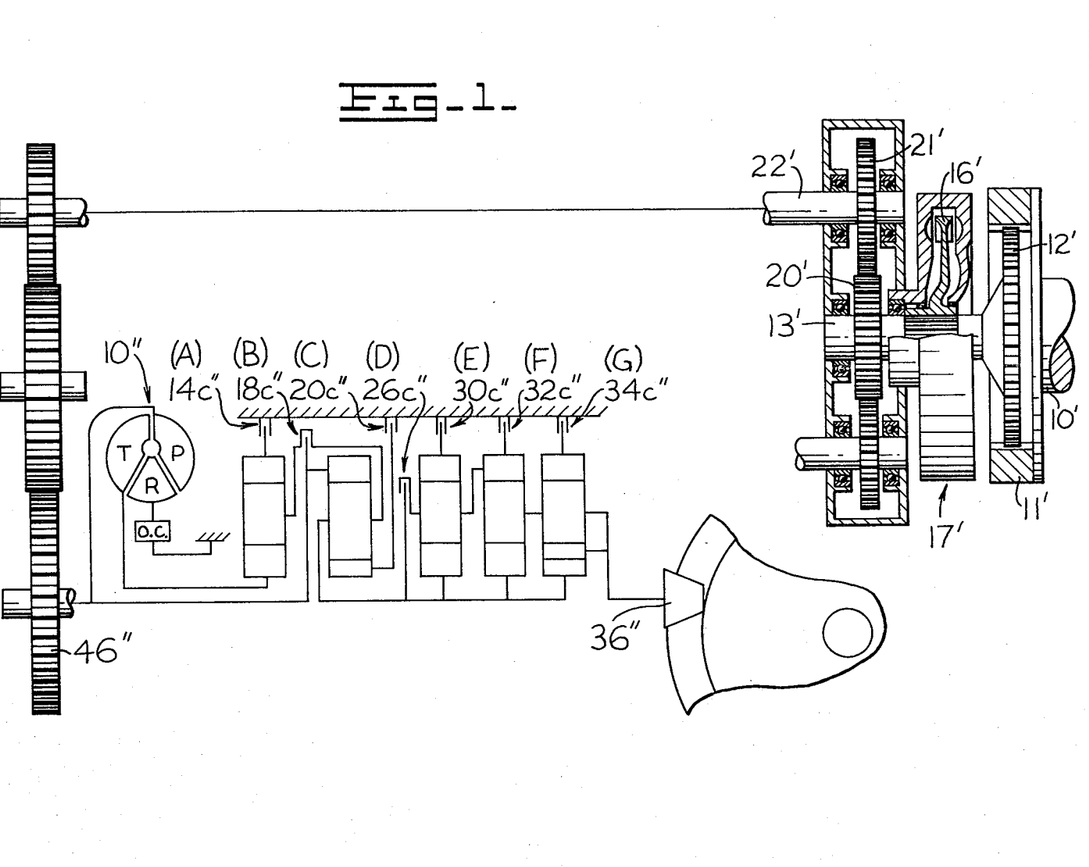
FIG. 1 schematically illustrates the transmission drive train of this invention.

The transmission drive train illustrated in FIG. 1 is fully disclosed in two co-pending applications, assigned to the assignee of this application. The numerals accompanied by a prime symbol (′) denote structures having corresponding numerals, disclosed in U.S. patent application Ser. No. 508,890, now Pat. No. 3,352,385 entitled "Hydrodynamic Retarder" and filed on Nov. 22, 1965 by Lowell E. Johnson.

This hydrodynamic retarder assembly comprises an input or engine driven shaft 10′ suitably arranged to drive a flywheel 11′. A gear 12′ is preferably splined to the flywheel and a rotor shaft 13′ which in turn drives a rotor 16′. Rotor shaft 13′ is suitably arranged to drive transfer gears 20′ and 21′. Gear 21′ is further arranged to drive a shaft 22′ to provide a power input to a multi-speed gear assembly by means of the schematically illustrated transfer gears.

U.S. patent application Ser. No. 467,267, now Pat. No. 3,347,113 entitled "Transmission" and filed on June 28, 1965 by Charles A. Ramsel, discloses the specific constructions and arrangements of the illustrated multi-speed transmission. The numerals disclosed in FIG. 1 correspond to those appearing in the last mentioned application, but are accompanied by a double prime symbol (″). As illustrated, a transfer gear 46″ is arranged to provide a power input to the multi-speed assembly comprising a torque converter 10″ and a series of brakes and clutches arranged to be selectively actuated.

For purposes of this invention, brake 14c″, clutch 18c″ and brake 20c″ will be termed the "load drive establishing means" whereas clutch 26c″ and brakes 30c″, 32c″ and 34c″ will be termed the "rear drive establishing means." The multi-speed gear assembly is suitably arranged to drive an output member or pinion gear 36″ which operatively meshes with a face gear of the vehicle's differential. The clutches and brakes will be generically termed "drive establishing means."

Hydraulic control system

Figure 2:
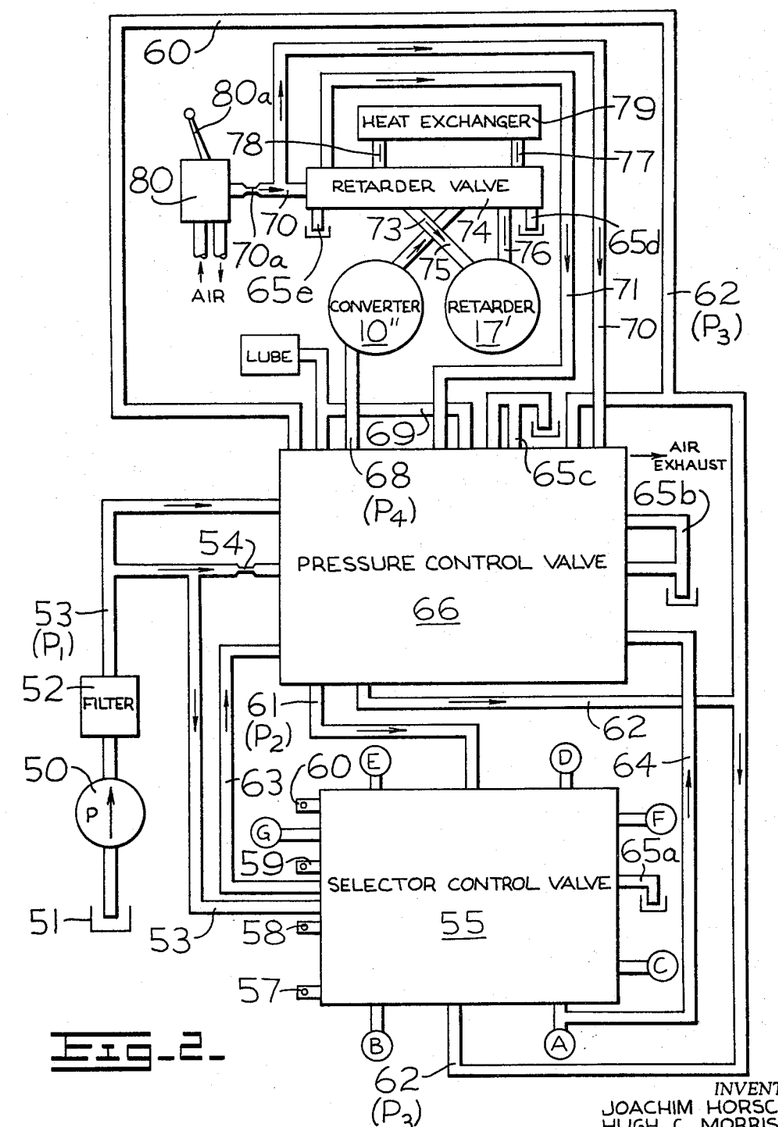
FIG. 2 schematically illustrates the hydraulic control system adapted to engage the transmission drive train of FIG. 1 in a selected condition of operation.
Figure 3:
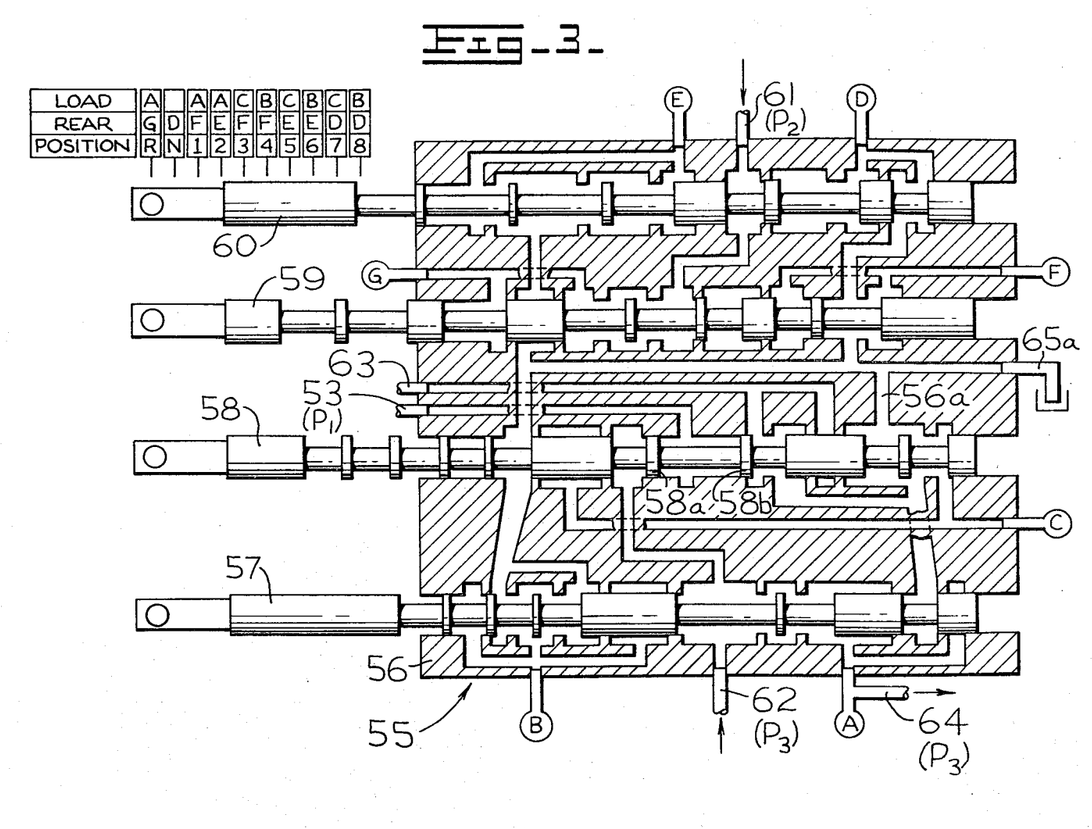
FIG. 3 is a cross-sectional view of the selector control valve, employed in the FIG. 2 control system.
Figure 4:
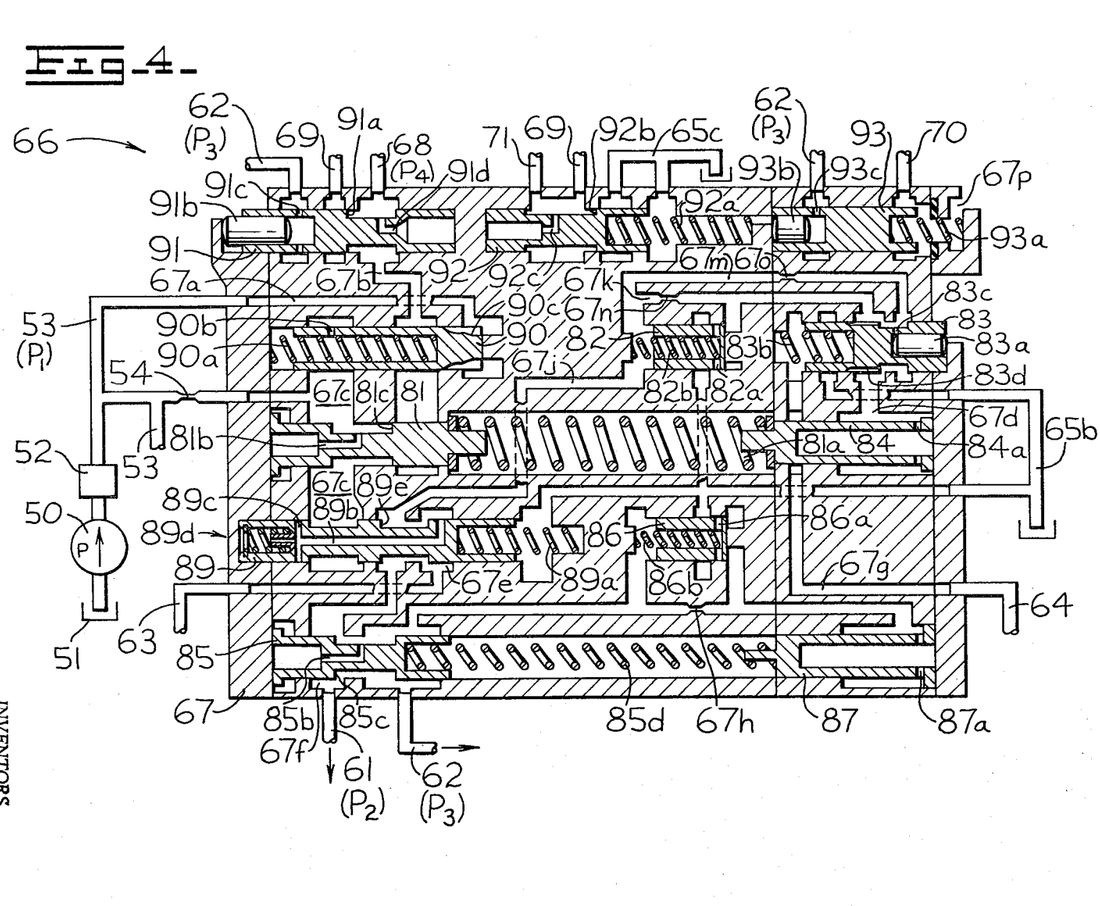
FIG. 4 is a cross-sectional view, partially schematic, disclosing the specific constructions and arrangements of the pressure control valve employed in the FIG. 2 control system.

Reference is now made to FIGS. 2–4 which schematically illustrate the hydraulic control system utilized to selectively actuate the transmission drive train illustrated in FIG. 1. A positive displacement pump 50 is suitably connected to the engine by gear means (not shown) to pump pressurized fluid from sump 51 through a filter 52 arranged in conduit 53. The filter functions in a conventional manner to screen out undesirable contaminants from the fluid. Conduit 53 thereafter communicates the fluid via branches thereof, one of which includes restriction 54, to a selector control valve 55 and a pressure control valve 66 for purposes hereinafter explained.

Selector control valve 55 (FIG. 3) comprises a housing 56 constructed and arranged to slidably mount valve spools 57, 58, 59, and 60. The valves function to selectively communicate fluid to clutches and/or brakes A through G. Conduits 61 through 64 and drain conduit 65a communicate with the selector control valve for purposes hereinafter explained.

Pressure control valve 66 (FIG. 4), comprising a housing 67, is integrated into the system and arranged to communicate with aforementioned conduits 53 and 61 through 64. In addition, the pressure control valve communicates with a torque converter inlet conduit 68, lubrication conduit 69, drain conduits 65b and 65c, and conduits 70 and 71 of the hydrodynamic retarder system.

FIG. 2 schematically illustrates the retarder control system, arranged to be supplied with fluid by converter 10″ via conduit 73. A retarder control valve 74 is arranged to be selectively actuated to communicate fluid from conduit 73 to a conduit 75 which in turn communicates with retarder 17′. A conduit 76 is arranged to selectively communicate through the retarder control valve to a drain conduit 65d or a conduit 77. Conduit 77 and a conduit 78 are arranged to communicate the fluid through a conventional heat exchanger 79 to cool the fluid passed through the torque converter and retarder.

An air control valve 80 is arranged to selectively actuate the retarder control valve in a manner hereinafter explained. This air control valve may be of the type disclosed in U.S. Patent No. 3,057,666, entitled, "Brake Control for Tractor Trailer Combinations with Retarder Systems," and issued on Oct. 9, 1962, to A. W. Sieving et al. This patent is assigned to the assignee of this application.

Selector control valve

Referring to FIGS. 2 and 3, the axes of valve spools 57 through 60 of selector control valve 55 are arranged in substantially parallel relationship to adapt themselves for simultaneous movement by a suitable lever means (not shown) readily accessible to the vehicle's operator. The block diagram illustrated in FIG. 3 discloses ten different spool positions and thus ten different conditions of transmission operation.

In general, simultaneous movement of spools 57 and 58 to selected positions functions to communicate pressurized fluid from conduit 62 to load drive establishing means A (brake 14c″), B (clutch 18c″) or C (brake 20c″). Spools 59 and 60 are arranged to communicate fluid from conduit 61 to rear drive establishing means D (clutch 26c″), E (brake 30c″), F (brake 32c″) or G (brake 34c″). The fluid pressures prevalent in the following conduits will be hereinafter denoted as follows: conduit 53 ($P_1$), conduit 61 ($P_2$), conduit 62 ($P_3$), and conduit 68 ($P_4$).

Referring once again to the block diagram disclosed in FIG. 3, the spools are positioned in the reverse condition of transmission operation with rear brake G exposed to $P_2$ in conduit 61 and load brake A exposed to $P_3$ in conduit 62. A suitable tracing of the fluid passages communicating with drive establishing means B through F will find that these drive establishing means are maintained open to drain conduit 65a.

Although $P_1$ is supplied to selector control valve 55 through a branch of conduit 53, it should be noted that $P_1$ is blocked by lands 58a and 58b of spool 58 during the reverse condition of operation. Thus conduit 63, constituting a "safety reset" or first signal means for purposes hereinafter explained, is maintained in direct communication with drain conduit 65a via a passage 56a and does not communicate with conduit 53. Also during this condition of operation, conduit 64 communicates $P_3$ to pressure control valve 66 (FIG. 2) to provide a second signal means for purposes hereinafter explained.

When the spools are moved to the neutral (N) position from the aforedescribed reverse position, spools 57 and 58 are positioned to communicate all of the load drive establishing means with drain conduit 65a. Spools 59 and 60 are positioned simultaneously to communicate P₂ to rear clutch D. P₁ is now communicated from conduit 53 to conduit 63 via the passages formed by lands 58a and 58b to thus communicate a highly pressurized fluid signal to pressure control valve 66. This "safety reset" signal is only directed to the pressure control valve in the neutral condition of transmission operation.

The block diagram in FIG. 3 further illustrates the eight forward speeds of vehicle operation and the positions the selector control valve spools assume to achieve same. It should be noted that one load drive establishing means and one rear drive establishing means are actuated during each forward speed. The remaining drive establishing means are maintained in communication with drain conduit 65a.

The additional passages formed in the selector control valve to achieve the above briefly mentional desiderata do not comprise novel aspects of this invention per se. Therefore, further discussions thereof will not be made.

*Pressure control valve*

Figure 8:
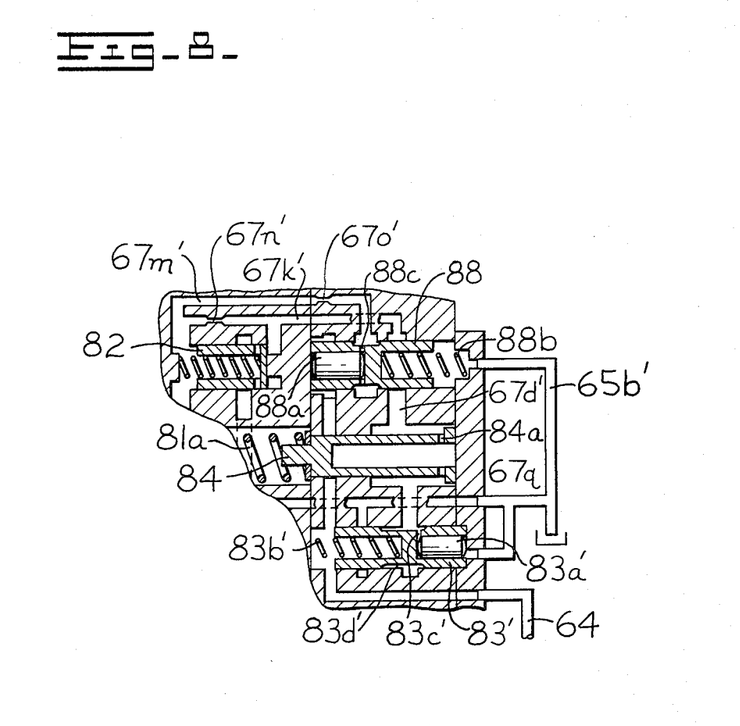
FIG. 8 is a fragmentary cross-sectional view illustrating a modified form of the pressure control valve of FIG. 4.

Pressure control valve 66 is disclosed in FIG. 4 as it would appear with no fluid pressure contained therein, i.e., the various valve spools are urged to extreme positions by their associated biasing springs. The control valve constitutes two modulating systems. The first system comprises a pressure modulating relief valve 81, a spring loaded check valve 82, a load piston relief valve 83 and a load piston 84. The second system comprises a pressure modulating reducing valve 85, a spring loaded check valve 86 and a load piston 87. As will be hereinafter explained, FIG. 8 illustrates a modified form of the first system and further comprises a sequence valve 88.

The first system controls P₂ in conduit 61 and the second system controls P₃ in conduit 62. The pressure control valve further comprises a safety valve 89, a flow limiting valve 90, a converter inlet relief valve 91, a lubrication relief valve 92 and a hydrodynamic retarder shut-off valve 93.

Pump 50 is suitably arranged to discharge P₁ through conduit 53 to the pressure control valve. The fluid communicates with a passage 67a formed in housing 67 and thus flow limiting valve 90, slideably arranged in a bore and urged rightwardly by a spring 90a. The valve comprises a port 90b and throttling slots 90c arranged to selectively communicate fluid to a passage 67b, past relief valve 91 and into conduit 68, leading to the inlet of converter 10″.

Relief valve 91 is slideably arranged in a bore and provides a ratio proportioning function whereby excess fluid pressure is relieved automatically across a metering edge 91a to the transmission's lubrication system via conduit 69. Otherwise stated, this valve maintains P₄ in direct proportion to P₃ if circuit restriction downstream of conduit 68 is maintained at a sufficiently high level. This pressure ratio is held substantially constant since P₃ acts on a slug 91b and the valve spool via ports 91c whereas P₄ applies a counteracting force against the other end of the valve spool via passage 91d. Thus, a slightly higher maximum pressure setting may be maintained in converter drive than in mechanical drive.

Returning once again to the description of flow limiting valve 90, a flow restriction 54 is arranged in a branch conduit 53 to allow a maximum of 15 g.p.m. for example, to be communicated to a compartment 67c. Fluid pressure in this compartment is communicated through port 90b of valve 90 to urge it rightwardly along with spring 90a. It can be seen that P₁ applies a counteracting force on the right end of the valve. A pressure differential of 25 p.s.i., for example, may be maintained between P₁ and the pressure in compartment 67c to provide a predetermined maximum flow into compartment 67c and to position the valve to allow the excess flow of fluid to be bypassed through throttling slots 90c to the converter inlet.

Compartment 67c is further arranged to communicate fluid to pressure modulating relief valve 81. The relief valve is biased leftwardly by spring 81a, the opposite end of which engages load piston 84. The load piston comprises a plurality of radially disposed orifices 84a arranged to communicate compartment 67c with a chamber formed in the valve for purposes hereinafter explained.

Relief valve 81 comprises a passage 81b arranged to communicate fluid to the left end of the valve to urge it rightwardly against spring 81a. Thus, relief valve 81 may be positioned automatically during selected phases of transmission operation to allow fluid in compartment 67c to be communicated past a throttling or metering edge 81c of valve 81 to passage 67b and converter inlet 68.

The safety valve is urged leftwardly by a spring 89a. Pressurized fluid may be communicated to the leftward end of the valve via a centrally disposed passage 89b, ports 89c and spring biased poppet valve 89d having an orifice formed therethrough. It can be seen that increased fluid pressure in passage 89b will tend to move the valve rightwardly against the resisting force of compression spring 89a. As will be hereinafter more fully explained, a safety reset or fluid pressure signal may be communicated from conduit 63 to an annular chamber 67e when selector control valve 55 is in its neutral condition of transmission operation.

The pressurized fluid in chamber 67c may be then communicated selectively to a chamber 67f, arranged to surround pressure modulating reducing valve 85. The reducing valve includes a centrally disposed passage 85b arranged to communicate fluid to a chamber formed at the leftward end of the valve. The valve is suitably arranged to form a throttling edge 85c arranged to communicate pressure from chamber 67f to conduit 62. A spring 85d is arranged to urge the reducing valve in a leftward direction and is further arranged to urge load piston 87 in a rightward direction.

The load piston comprises a chamber formed at its right end arranged to communicate with radially disposed orifices 87a, shown in communication with a passage 67g. Passage 67g has a restricted orifice 67h formed therein, arranged to communicate with reducing valve 85 and valve 86. The check valve is slideably arranged in a bore and comprises a plurality of radially disposed ports 86a and a spring 86b arranged to urge the valve rightwardly. The ports may be arranged to communicate with drain conduit 65b as do ports 82a of second check valve 82 during a shift.

The second check valve comprises the plurality of radially disposed ports 82a, arranged to communicate with the chamber containing spring 82b. The chamber may also be arranged to communicate with safety valve 89 through a passage 67j. Passage 67j is further arranged to communicate with passages 67k and 67m having restricted orifices 67n and 67o formed therein, respectively. Passages 67k and 67m are arranged to communicate with load piston relief valve 83, having a slug 83a slideably arranged in the right end thereof and a spring 83b arranged at its other end to urge the valve rightwardly. A port 83c is arranged to communicate fluid from passages 67k and 67m to the slug's retaining chamber. Metering slots 83d are formed on the periphery of the relief valve for selectively communicating fluid to drain conduit 65b.

Figure 9:
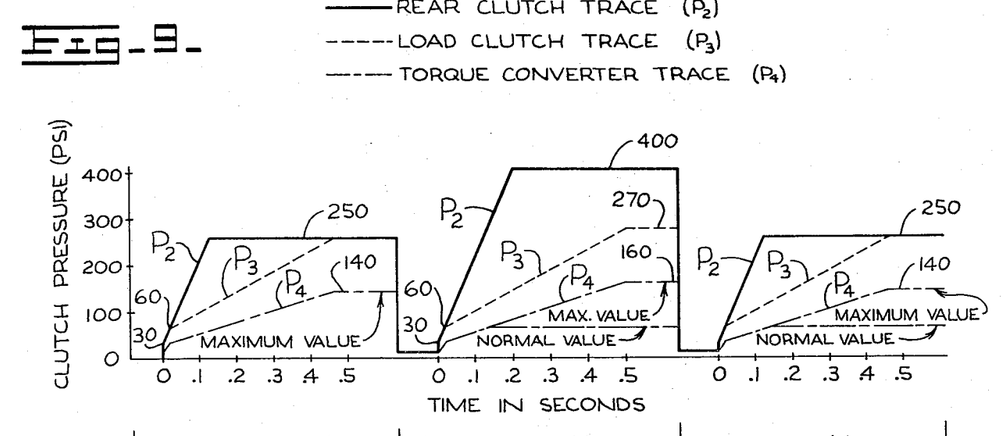
FIG. 9 is a graph illustrating various pressure traces which occur in the FIG. 2 control system when the FIG. 4 pressure control valve is employed therein.

The purpose of relief valve 83 is to provide higher maximum pressure settings for the clutches in converter drive than in mechanical drive. In converter operation conduit 64 is pressurized and valve 83 is held in the position shown to communicate flow through conduits 67k and 67m to load piston 84. This allows load piston 84 to move leftwardly its full travel resulting in high maximum pressure operation (FIG. 9—Position No. 1).

However, in mechanical drive conduit 64 is opened to drain and valve 83 is urged leftwardly by pressure acting on slug 83a to effect a connection between slots 83d and drain 65b. Thus, a lower pressure level is maintained in passage 67d and load piston 84 travels a lesser, predetermined amount to provide lower maximum clutch pressures (FIG. 9—Positions No. N and No. 3). It should be noted that the rate of pressure rise of each of $P_2$ and $P_3$ is the same in both converter or mechanical drive.

FIG. 8 discloses the above mentioned modified first modulating system, further comprising a sequence valve 88 suitably arranged in the manner shown to provide a dual rate of pressure rise ($P_2$) in mechanical drive. This valve comprises a spring 88b, arranged to urge the valve in a leftward direction, and a slug 88a slideably arranged on the other end of the valve for purposes hereinafter explained. Radial ports 88c are arranged to communicate fluid from passage 67m to the slug retaining chamber.

Figure 10:
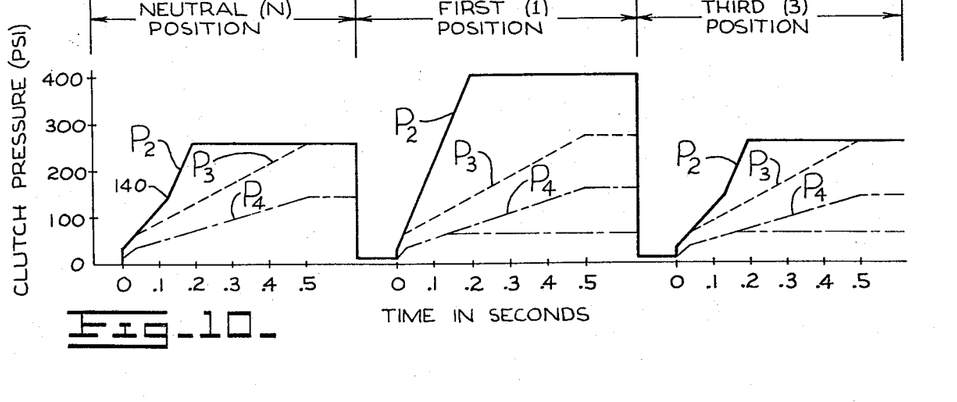
FIG. 10 is a graph similar to FIG. 9 illustrating a control system which employs the modified pressure control valve of FIG. 8.

It should be noted that conduit 64 is maintained in direct communication with the left end of sequence valve 88 and capable of transmitting fluid pressure thereto to move the valve fully rightwardly. This eliminates the sequencing of the orifices and allows fluid in conduits 67k' and 67m' to flow to load piston 84 and cause a single high rate of pressure rise when in converter drive (FIG. 10—Position No. 1). As previously described pressure in conduit 64 also prevents leftward movement of relief valve 83' to allow $P_2$ to rise to a maximum value.

The net result is that higher maximum pressure levels and a uniform high rate of pressure rise $P_2$ are achieved. In mechanical drive the left end of valve 88 and conduit 64 are opened to drain and valve 88 blocks flow in passage 67m'. Therefore, the initial rate of pressure rise is determined by flow through orifice 67n' only. When $P_2$ reaches a predetermined value, for example 140 p.s.i., valve 88 moves rightwardly to connect the additional flow through orifice 67o' to thereby increase the pressure rise rate.

It should be noted that structures identical to those illustrated in FIG. 4 are depicted by the same numerals. Structures which have been modified slightly are accompanied by a prime symbol ('). For example, load piston relief valve 83' in FIG. 8 is relocated between load pistons 84 and 87. The functions thereof are substantially identical.

The pressure control valve further comprises lubrication relief valve 92 arranged to be biased in a leftward direction by spring 92a. This valve is utilized to limit the lubrication pressure in conduit 71 to 25 p.s.i., for example. Metering edge 92b is arranged to relieve excess fluid pressure to a drain conduit 65c. A chamber formed at the left end of the valve is arranged to communicate with with passage 92c which in turn communicates with conduit 69.

Retarder control valve 74 is arranged to be controlled automatically by retarder shut-off valve 93. Valve 93 comprises a spring 93a arranged to urge it in a leftward direction and a slug 93b arranged in a chamber at the other end of the valve. This chamber communicates with $P_3$ by means of port 93c. When the valve assumes the position shown, pressurized air in conduit 70 is exhausted to atmosphere via passage 67p.

*Retarder control system*

Referring more particularly to FIGS. 2 and 5–7, retarder control valve 74 is arranged to be selectively actuated by a handle 80a of air control valve 80. The retarder control valve comprises a valve spool 94 slideably arranged in housing 95. Air control valve 80 is arranged to control the air pressure in a chamber 95a at the left end of the spool valve and at retarder shut-off valve 93 of pressure control valve 66 via conduit 70. A restriction 70a is formed in the conduit for purposes hereinafter explained.

Conduit 73 (FIG. 2) communicates with the chamber of converter 10'' to supply fluid selectively through the retarder control valve, through conduit 75 and into retarder 17'. The fluid from the retarder is returned to the control valve by conduit 76 which may be arranged to communicate with drain conduit 65d or outlet conduit 77.

Conduit 77 is arranged to communicate fluid to conventional heat exchanger 79 which in turn returns the cooled fluid to the retarder control valve via conduit 78. Depending upon the position of valve spool 94, fluid in conduit 78 is communicated to conduit 71 leading to relief valve 92 of pressure control valve 66 and/or conduit 75 leading to retarder 17'.

Figure 5:
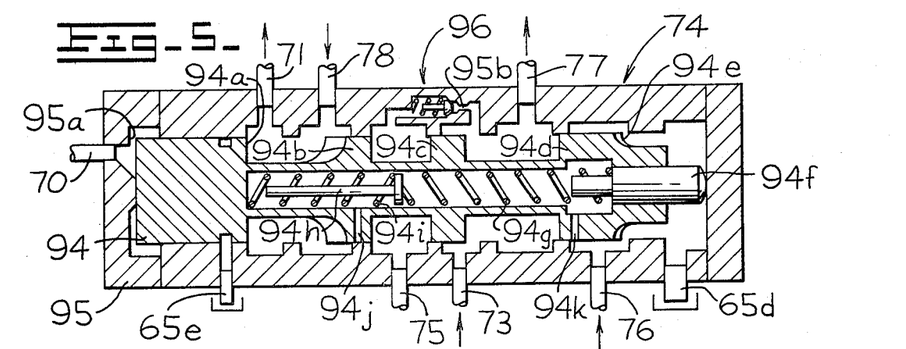
FIGS. 5–7 are cross-sectional views disclosing the constructions, arrangements and operational conditions of a hydrodynamic retarder control valve illustrated in FIG. 2.

Valve spool 94 comprises lands 94a through 94d for selectively passing fluid thereby, depending upon the position of the spool. Throttling slots are provided on 94b to improve valve stability and slots 94e are formed on the right end of the spool to dump fluid from conduit 76 to drain conduit 65d when the retarder is deactivated (FIG. 5). A slug 94f is slidably arranged in the spool and abuts the valve housing under the biasing action of compression springs 94g and 94i.

The two springs are arranged on both sides of a stop member 94h in such a manner that a duel spring rate is produced. Holes 94j and 94k are arranged in the spool to communicate fluid to the spring chamber from retarder inlet 75 and retarder outlet 76 respectively. A spring loaded poppet valve 96 is arranged to cooperate with a restricted passage 95b for purposes hereinafter explained.

*Transmission operation*

In order to convey full understanding of the primary operational functions and features herein involved, the transmission will be assumed to be engaged in its reverse and then neutral condition of operation. Thereafter, it will be assumed that selector control valve 55 (FIG. 3) is shifted from neutral (N) to the first forward speed, employing torque converter 10'' (position No. 1), and then to the first mechanical drive position (position No. 3).

Reference will be made throughout the following discussions to FIG. 9 illustrating the traces of fluid pressures $P_2$, $P_3$, and $P_4$ during certain shifts, when the FIG. 4 pressure control valve is utilized. As will be hereinafter explained, FIG. 10 illustrates corresponding traces which occur when the modified FIG. 8 pressure control valve is employed.

*Reverse position*

FIG. 3 discloses the selector control valve spools as they would appear in the reverse (R) condition of transmission operation. During this condition, the engine is running to communicate fluid from pump 50 (FIG. 2) to torque converter load brake A and rear brake G. The other drive establishing means are open to drain in the manner aforedescribed.

The above described first system of pressure control valve 66 modulates $P_2$ to rear brake G whereas the second system modulates $P_3$ to load brake A. These pressures are modulated in substantially the same manner as illustrated by the "first position" portion of FIG. 9. Further discussions thereon will be made hereinafter.

It should be noted that $P_1$ is supplied to selector control valve 55 via conduit 53 but is blocked therein by lands 58a and 58b of spool 58. Also, safety reset signal conduit 63 is in direct communication with the drain conduit 65a via intermediate passageway 56a.

Conduit 62 is maintained in communication with conduit 64, leading to load brake A, so that when this brake receives $P_3$ such fluid pressure is also directed to the pressure control valve 66, as illustrated in FIG. 4. This feedback signal functions to urge sequence valve 83 rightwardly during a converter drive transmission shift, as was mentioned previously.

Neutral position

When the spools of selector control valve 55 are moved to their neutral position (N), spools 57 and 58 prevent $P_3$ from communicating with any one of the load drive establishing means. The load drive establishing means are maintained in communication with drain conduit 65b. Spools 59 and 60 allow $P_2$ to be communicated to rear clutch D. This fluid pressure is modulated to rear clutch D by the above described first system in a manner similar to that explained hereinafter. In short, the "neutral position" portion of FIG. 9 illustrates the rise of fluid pressures $P_2$, $P_3$ and $P_4$.

It is assumed that the engine has been started and full flow from pump 50 fills the various passages immediately, i.e., no "priming" is needed. The system pressure is seen to rise approximately 30 p.s.i. $P_2$ and $P_3$ rise at substantially the same rate until 60 p.s.i. is reached. At this point, $P_3$ proceeds to assume a lower rate of pressure rise than $P_2$. As illustrated in FIG. 9, $P_2$ and $P_3$ then level off at a maximum 250 p.s.i. when relief valve 83 moves leftward to meter fluid from compartment 67d to drain 65b. This function is made possible because conduit 64 is drained in the Neutral condition of operation.

At the same time $P_4$, leading to the torque converter, rises immediately to a first maximum of approximately 25 p.s.i. This pressure is maintained until the converter relief valve 91 begins to perform its previously described ratio proportioning function. The converter inlet pressure is limited to a second maximum of approximately 140 p.s.i., it having been assumed that the vehicle was started with "cold" oil contained therein and circuit restrictions are high.

Referring to FIG. 3, lands 58a and 58b of spool 58 are arranged to communicate $P_1$ to conduit 63 to allow a relatively high pressure signal to be transmitted to pressure control valve 66 during the neutral position. This "safety reset signal" means is only operative to communicate with pressure control valve 66 via conduit 63 in this neutral condition of transmission operation. Conduit 63 is maintained in communication with drain conduit 65b during all other conditions of transmission operation.

The fact that the safety valve is in the position shown assures that the vehicle will not move, i.e., drive establishing means remain disengaged, when it is started in a gear other than neutral. For example, a prolonged period of fluid pressure reduction in compartment 67c, such as when the engine is not running, would permit valve 89 to be moved leftwardly by spring 89a to disengage the load and rear drive establishing means from the circuit. Otherwise stated, fluid cannot be communicated from chamber 67c to chamber 67f and then to the drive establishing means since land 89e prevents same.

When the vehicle is started in neutral position (N) the pressure controlled by relief valve 81 (pressure $P_2$) will rise to approximately 250 p.s.i. and rear clutch D will be engaged causing certain hydraulic and transmission loads to be imposed on the engine. These loads can be reduced by starting the vehicle in gear because safety valve 89 assumes the position shown to disengage all drive establishing means, and relief valve 81 maintains its initial low pressure setting. This feature is of importance during cold weather starting as horsepower losses are minimized.

However, during neutral $P_1$ is directed from a branch of conduit 53 to selector control valve 55 through conduit 63 and into chamber 67e surrounding safety valve 89. This fluid pressure in then communicated through central passageway 89b and past poppet valve 89d to effect rightward movement of the valve against the force of spring 89a. Valve movement continues until 89c is put into communication with chamber 67c. The fluid pressure in chamber 67c is now substantially equal to $P_2$ and thus "takes over" to continue movement of spool valve 89 to its extreme rightward position.

It is desirable that this second pressure govern to hold safety valve 89 in this rightward position since $P_1$ is not available in chamber 67e in other gear positions. Chambers 67c, 67f, and 67j, maintained in direct communication, continue to remain so despite continued gear shifting. While the fluid pressure in compartment 67c may drop momentarily during a shift, poppet valve 89d is suitably sized to limit fluid flow out of its compartment to thereby delay the safety spool reset.

Shift from neutral to first position

Assuming that selector control valve 55 is actuated from the aforedescribed neutral to the first forward speed condition of transmission operation, it can be seen in the "first position" portion of FIG. 9 that the three pressures drop immediately to commence fill. In this gear position, load brake A and rear brake F are engaged. If we assume that both brakes fill at substantially the same time, a substantially horizontal brake fill pressure trace at approximately 25 p.s.i. prevails. The rear brake completes its fill period and the pressure rises immediately to the initial setting of 30 p.s.i.

In this converter drive gear, a signal from load brake A enables the two pressures to reach higher maximum level settings than during "neutral position" due to the aforedescribed arrangement of conduit 74 which communicates with valve 83 to perform this function. Regarding the function of converter inlet relief valve 91 during this period, it is assumed that the oil is warmed to a point whereat high back pressures are eliminated to thereby stop the rise of the converter inlet pressure at approximately 60 p.s.i. $P_2$ and $P_3$ are seen to remain equal to approximately 60 p.s.i. Continuing rightwardly in FIG. 9, $P_3$ at load brake A acts on the left end of valve 83 (FIG. 4) via conduit 64 and functions along with spring 83b to hold it rightwardly. The above described first modulation system continues to control the rise of $P_2$, primarily due to modulating functions performed by load piston 84 on valve 81. $P_2$ rises at a linear rate as controlled by orifices 67n and 67o and then reaches a maximum level as determined by the full travel of load piston 84. Similarly, $P_3$ rises at a linear rate as controlled by orifice 67h and reaches a maximum level as determined by the full travel of load piston 87. Load pistons 84 and 87 are thereafter maintained in their extreme leftward positions to limit $P_2$ and $P_3$ to maximum levels of 400 p.s.i. and 270 p.s.i., respectively.

Relief valve 92 (FIG. 4) continuously functions to limit the lubrication fluid pressure in conduit 69 to a maximum of 25 p.s.i., for example. Pressures in excess of this value are relieved across metering edge 92b to drain conduit 65c in a manner hereinafter explained. As hereinbefore described, $P_4$ at the converter inlet holds a maximum setting proportional to $P_3$. This relationship is reflected by the broken line traces illustrated in FIG. 9. Under normal operating conditions, converter 10″ does not allow a pressure build-up beyond 60 p.s.i. (FIG. 9).

Shift from first position to third position

FIG. 9 then discloses pressure traces occurring during a shift from the aforedescribed "first position" to the "third position" (mechanical gear) wherein load brake C and rear brake F are engaged. It can be seen that this portion of the diagram substantially corresponds to the first portion thereof. We again assume that both brakes become full at substantially the same time.

However, in actual practice, minor pressure level variances may be effected. For example, when a gear shift involves the filling of a single drive establishing means, the fill pressure is approximately 30 p.s.i. while in a gear shift involving the filling of two drive establishing means (as in the instant situation), fill pressure will approximate 20 p.s.i. It should be also understood that the pressure traces illustrated are somewhat smoother in configuration than the actual ones.

After selector control valve 55 has been selectively actuated to fill (at approximately 20 p.s.i.) and engage brakes C and F, pressure in compartment 67c of pressure control valve 66 rises quickly. The above described first and second modulating systems then control independently the rise of $P_2$ and $P_3$, respectively.

Regarding the first system, modulating relief valve 81 is moved rightwardly against spring 81a through the action of the pressure communicated to the chamber at the left end of the relief valve via passage 81b. Check valve 82 is urged rightwardly by spring 82b and the fluid communicated to it thereto from passage 67j. Rightward movement of this check valve cuts off commuinciation between load piston 84 and drain conduit 65b via the interconnecting passages. Chambers 67c and 67f, passages 67j and outlet conduit 61 are thereafter maintained at substantially the same fluid pressure $P_2$.

This pressure is not sufficient initially to move modulating reducing valve 85 of the second system against its biasing spring 85d, but is effective to urge check valve 86 rightwardly to engage its associated stop. When check valve 86 moves rightwardly, load piston 87 is disconnected from its communication with drain conduit 65b. At this point, the pressures in conduit 61 ($P_2$) and 62 ($P_3$) are substantially equalized up to 60 p.s.i. (FIG. 9). $P_3$ is also communicated to converter inlet relief valve 91 to perform its ratio proportioning function whereby a maximum $P_4$ is maintained directly proportional to $P_3$. This pressure ratio is held substantially constant in the manner hereinbefore described.

The above mentioned first modulating system continues to modulate fluid pressure in rear brake F. Fluid pressure $P_2$ in passages 67k and 67m flows to the compartment behind load piston 84 via relief valve 83 and ports 84a. As the pressure in this compartment increases, the load piston moves leftwardly to compress spring 81a which functions to control the size of the metering gap formed at land 81c of pressure modulating relief valve 81. Such fluid restriction then functions to raise $P_2$ in compartment 67c.

At the same time the second modulating system reacts as the initial setting of spring 85d is overcome by $P_2$ which is communicated to the left end of modulating reducing valve 85 via passage 85b. Rightward movement of valve 85 causes a restricted fluid flow at metering edge 85c to conduit 62 ($P_3$). Prior to such movement, $P_2$ and $P_3$ communicating with rear brake F and load brake C, respectively, were equal and rising at the same rate due to the controlled action at orifices 67n and 67o. After 60 p.s.i. is achieved, the fluid pressures in the two brakes are modulated independently as illustrated in FIG. 9.

The pressure rise cycle of the first modulating system continues as load piston 84 moves leftwardly. However, the pressure in passage 67j has increased to a point whereby the initial setting of spring 83b of relief valve 83 has been overcome. Relief valve 83 then moves leftwardly as a result of having $P_2$ communicated to the right end thereof via passage 67m and 67k and also ports 83c to limit the maximum brake pressures to a level lower than that achieved in converter drive as previously described.

The second modulating system has also been controlling the rate of pressure rise of $P_3$ to the load drive establishing means, but at a lesser rate as determined by the size of orifice 67h. As the pressure downstream of orifice 67h communicates via ports 87a to the compartment behind load piston 87, the point is reached whereby the load piston is moved leftwardly. The rate of pressure rise for the second modulating system continues until $P_3$ reaches the 250 p.s.i. level of $P_2$. At this point, spring 85d urges valve 85 leftwardly against its associated stop and the shift to third position is completed.

*Modified control system*

FIG. 10 discloses pressure traces similar to those disclosed in FIG. 9, but with the first modulating system employing the modified version of pressure control valve 66, illustrated in FIG. 8. The primary functional difference between the two control valve arrangements is that the FIG. 8 control valve allows the rear drive establishing means fluid pressure $P_2$ to initially rise at a slow rate (FIG. 10) and then at a certain pressure change to a faster rate when in mechanical drive.

In essence, the FIG. 4 control system maintains relief valve 83 in a blocked position rightwardly in converter drive. Orifices 67n and 67o are thus arranged to continually function in parallel to supply fluid to load piston 84 of the first system to control $P_2$. This arrangement is not as complex as the one disclosed in FIG. 8. However, it should be noted that the FIG. 8 arrangement allows a somewhat greater degree of flexibility during transmission operation than that which is inherent with the coresponding arrangement of FIG. 4.

The modified control system of FIG. 8 provides a smoother mechanical drive shaft than the corresponding FIG. 4 structures because the rear drive establishing means can be initially engaged at a low rate which extends the inertia sharing period. The change to a faster rate of pressure rise in the rear drive establishing means after the initial low rate insures that the total modulation cycle of $P_2$ is short and that the load drive establishing means are the last to engage.

The rate of rise of the second modulating system ($P_3$) is not effected by the modified first system since load piston 87 continues to move leftwardly to modulate valve 85 independently thereof. Otherwise stated, the pressure traces for $P_3$ in FIGS. 9 and 10 are substantially identical.

*Hydrodynamic retarder operation*

FIG. 5 discloses retarder control valve 74 as it would appear with hydrodynamic retarder 17' (FIG. 2) deactivated. During this condition of transmission operation, fluid from converter 10'' enters the retarder control valve at conduit 73 whereafter the fluid passes between lands 94c and 94d to conduit 77, leading to heat exchanger 79. The fluid passing through the heat exchanger returns to the valve via conduit 78 and is then directed between lands 94a and 94b to an outlet conduit 71.

Heat exchanger 79 may be of a conventional type utilizing water from the engine radiator, for example, for cooling purposes. A second heat exchanger, such as an air-to-oil cooler utilizing the engine's fan driven air for cooling purposes, may be arranged in conduit 71 for purposes hereinafter explained. During this nonretarding condition of operation, spool 94 is moved to its extreme leftward position by springs 94g and 94i to communicate retarder outlet conduit 76 to drain conduit 65d via slots 94e.

Poppet valve 96 functions in cooperation with the restricted orifice in passage 95b to accomplish a dual function. Firstly, the incoming fluid from the converter outlet 73 is communicated to passage 95b to unseat the poppet of valve 96 at a predetermined fluid pressure. Thus, fluid is free to flow to conduit 75 for retarder lubrication purposes. This relatively low fluid flow may constitute one g.p.m. for example.

Secondly, it should be noted in FIG. 5 that retarder outlet 76 is maintained in direct communication with drain conduit 65d. Since in actual application heat exchanger 79 is located above retarder 17' physically (FIG. 2), fluid would normally tend to drain down from the heat exchanger and fill the retarder via conduit 77 and passage 95b if poppet valve 96 was not utilized to prevent same.

For example, the poppet valve may be set to communicate conduits 73 and 75 via passage 95b at 20 p.s.i. During winter or extreme cold conditions of operation, for example, a retarder filled with cold oil would probably absorb excessive power when the vehicle's engine is started. The arrangement of poppet valve 96 alleviates such an undesirable "hard start" condition.

Figure 6:
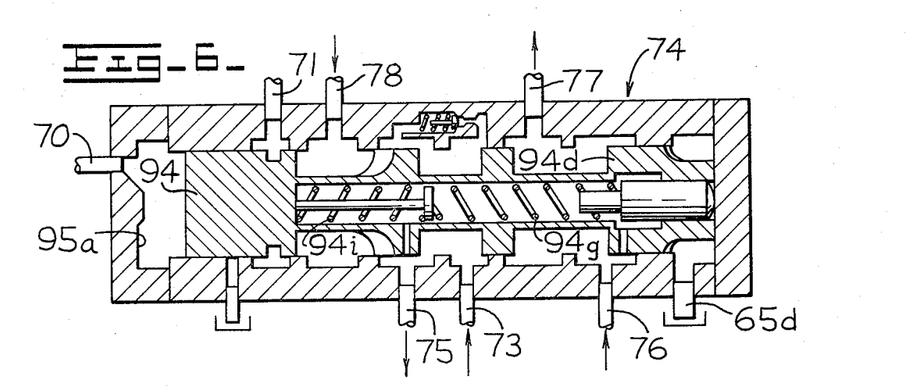

Referring now to FIGS. 2 and 6, activation of the retarder is accomplished by the operator who selectively moves handle 80a of air valve 80 to allow pressurized air to be communicated to chamber 95a. Spool 94 thus moves rightwardly against the force of springs 94g and 94i. The air pressure, obtained from a suitable supply (not shown) contained within the vehicle, is controllably delivered to outlet 70 in proportion to the movement of control lever 80a. As above stated, details of such an air control valve system are disclosed in U.S. Patent No. 3,057,666. It should be understood that a linkage-spring assembly can be substituted for air pressure to allow the operator to apply a force through a spring directly on retarder spool 94 for achieving a similar result. Such a linkage-spring arrangement as well as the above described air operated system can be considered to comprise resilient input means to spool 94.

Assume now that retarder 17' is being filled from torque converter outlet conduit 73 and spool 94 is moved fully rightwardly to the position illustrated in FIG. 6.

During this condition of operation, full flow from the torque converter to the retarder, for example, 30 g.p.m. maximum, is maintained. It should be noted that outlet conduit 71 is closed by land 94a and drain conduit 65d is closed by land 94d during the filling period. Thus, positive retarder filling may be achieved and conventional line restrictions and line complications are substantially eliminated.

Figure 7:
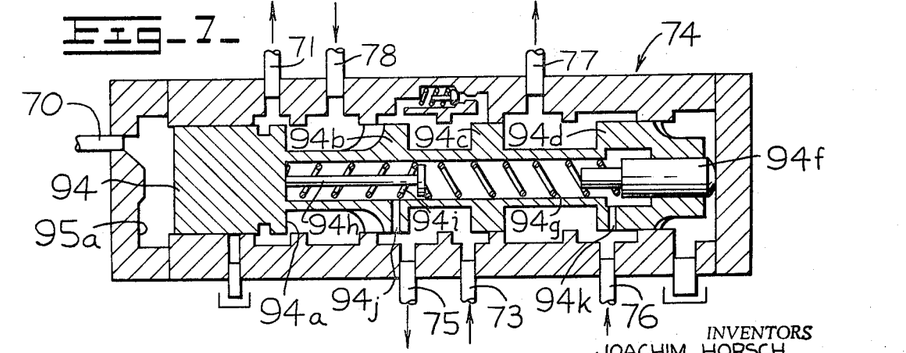

Referring now to FIG. 7, as the retarder is filled a pressure rise is created from the retarder inlet to the retarder outlet, and this will produce a flow from conduit 76 through port 94k, into the spring chamber, and through port 94j and into port 75. A pressure is produced in the spring chamber which acts against slug 94f to force spool 94 leftwardly. This pressure is a function of the pressures in ports 75 and 76, and also the ratio of diameters of ports 94j and 94k.

When air valve 80 is actuated to its full "on" position, with retarder 10" operating at a low r.p.m., the pressure in conduit 75 will approach the pressure in conduit 76. To prevent unduly high pressures in converter 10" ports 94j and 94k operate valve 94 in such a manner that the pressure in conduit 76 is reduced. This results in lower back pressure on the converter and broadens the controlled horsepower absorption range of the retarder.

The balanced position of spool 94 during retarding is thus a function of the air pressure maintained in chamber 95a, the forces generated by springs 94g and 94i and the fluid pressures passing through ports 94j and 94k. This balancing function results in a controlled metering action adjacent lands 94a and 94b to conduits 71 and 75, respectively.

During heavy retarding conditions of operation (FIG. 7), the retarder functions as a pump to circulate 150 g.p.m., for example, in a closed circuit comprising outlet conduit 76, the annular chamber formed between lands 94c and 94d, conduit 77, heat exchanger 79, conduit 78, the annular chamber formed between lands 94a and 94b and inlet conduit 75. Converter fluid is added to this loop from conduit 73 and the excess fluid is by-passed from the loop to conduit 71.

Land 94a is arranged to permit substantially the same amount of fluid to be bypassed to conduit 71 as is communicated to the retarder from torque converter outlet conduit 73. Thus, the energy absorbed in the retarder working fluid in the form of heat is communicated to heat exchanger 79 in substantially large and constant flow quantities. Meanwhile, a portion of the cooled fluid is communicated from conduit 71 to lubrication valve 92 and thence to transmission lubrication conduit 69. As above suggested, a second heat exchanger may be suitably arranged in conduit 71 in certain applications if the fluid temperature therein is still deemed too high for lubrication purposes.

Returning once again to a description of the balancing function of spool 94 during retarding, spring 94i is a low rate or "soft" spring which may be compressed with a relatively small change in air pressure in chamber 95a. The minimum compressed length of this spring corresponds to the length of stop member 94h. On the other hand, spring 94g is a high rate or relatively "hard" or stiff spring used primarily to match the change in the fluid flow forces across the metering slots formed by land 94b at conduit 75. As the size of these metering slots to the retarder inlet decreases, the forces tending to close the metering edge are counteracted in part by a corresponding decrease in the compressive force of spring 94g.

This counterbalancing effect of the stiffer spring 94g reduces "hunting" of spool 94 to enhance the regulation of the metering edges formed by lands 94a and 94b. The effective dual spring rate will allow spool 94 to be moved to the metering position with a relatively low air pressure. Once the spool is in metering position it will operate against high rate spring 94g only. In summary, the construction and arrangement of the two springs functions to reduce "hunting" of spool 94 and requires a lower air pressure than would be required if only one relatively stiff spring were used resulting in a more compact system.

Discussions relating to the operation of retarder cut-off valve 93 will now be made. In conventional vehicles wherein the retarder is located adjacent the vehicle's tractor wheels, a substantial amount of the generated torque loads are absorbed prior to their reaching the vehicle's transmission. However, it is seen that retarder 17' of this application (FIG. 1) is located between output 10' of the vehicle's engine and the vehicle's transmission. Thus, the torque developed by the vehicle's wheels must pass through the transmission before they are absorbed by the retarder.

This invention provides that $P_3$, arranged to also communicate with a load clutch, is directed to retarder disconnect valve 93 to exhaust air in a sufficient amount to deactivate the retarder system until the transmission modulation cycle has been completed. Thus, a signal means is provided for deactivating the retarder automatically to avoid dynamic loading problems with respect to the transmission.

Assuming that selector control valve 55 is shifted to engage the transmission in a selected gear with retarder valve 74 maintained in its FIG. 7 position, load clutch pressure $P_3$ in conduit 62 drops immediately. Reduced $P_3$ is relayed to retarder shut-off valve 93 (FIG. 4) to provide a fluid signal indicating that a new transmission clutch pressure modulating cycle has started.

During normal, steady state retarding conditions, $P_3$ is sufficiently high to move valve 93 to its extreme rightward position to prevent pressurized air in conduit 70 from being exhausted to atmosphere via 67p. During the above mentioned shift, $P_3$ decerases in conduit 62 and communicates with the chamber containing slug 93b to permit spring 93a to move valve 93 leftwardly a proportional amount. As illustrated in FIG. 4, pressurized air in conduit 70 thus escapes past valve 93 to atmosphere via passage 67p. The reduction in air pressure in conduit 70 will result in a corresponding reduction in chamber 95a to cause valve spool 94 to move leftwardly from the condition disclosed in FIG. 7 to that disclosed in FIG. 5.

Thus, a decrease in load clutch pressure $P_3$ "triggers" deactivation of the retarder automatically during a shift so that the engaged transmission drive establishing means do not have to absorb high retarder loads. As soon as the transmission shift is completed, $P_3$ rises to its previous level and air shut-off valve 93 closes to return retarder control valve 74 to its FIG. 7 position automatically.

Referring again to FIG. 2, it should be noted that flow restriction 70a in conduit 70 assures total retarder deactivation during the above mentioned shift. If such a restriction were not provided, the air pressure in chamber 95a (FIG. 7) might not be released to atmosphere at 67p (FIG. 4) fast enough for retarder deactivation purposes. Otherwise stated, without restriction 70a air pressure from air control valve 80 would freely communicate to chamber 95a to move spool 94 rightwardly to effect an undesirable degree of retardation during the shift.

We claim:

1. In a vehicle, a drive train comprising an input member drivingly connected to and driven by an engine driven power output shaft, a rotor of a hydrodynamic retarder coupled to be mechanically driven directly by said input member and gear means drivingly connecting said input member and rotor to a multi-speed gear assembly, said drive train further including a torque converter having an impeller operatively connected directly to the rotor of said retarder.

2. The invention of claim 1 wherein said multi-speed gear assembly comprises a plurality of load and rear drive establishing means and further comprising control means for engaging one each of said load and rear drive establishing means.

3. The invention of claim 1 further comprising first control means for shifting said multi-speed gear assembly into a selected condition of operation, second control means for activating said hydrodynamic retarder selectively to retard the speed of said multi-speed gear assembly and shut-off means for deactivating said hydrodynamic retarder automatically when said first control means is actuated to shift said multi-speed gear assembly.

4. The invention of claim 3 wherein said shut-off means is operatively connected to said second control means to activate said hydrodynamic retarder automatically after said last-mentioned shift is completed.

5. A control system operatively connected to a multi-speed transmission to engage said transmission in a selected speed ratio, said multi-speed transmission comprising a plurality of load and rear drive establishing means, said control system comprising selector valve means for communicating fluid selectively to said load and rear drive establishing means and pressure control valve means comprising separate first and second fluid circuit means communicating fluid past a valve spool of one of said first and second fluid circuit means and to said selector valve means directly for independently and automatically modulating the rate of fluid pressure rise in the load and rear drive establishing means at different rates.

6. The invention of claim 5 further comprising a torque converter operatively connected to be selectively engaged in said multi-speed transmission by one of said load drive establishing means, said pressure control valve means operatively connected to modulate the fluid pressure rise in the torque converter load drive establishing means to a level higher than when one of the other of said load drive establishing means is engaged.

7. The invention of claim 5 wherein said selector control valve means comprises a plurality of spools slidably mounted therein and disposed in substantially parallel relationship with respect to each other and slidably mounted in said selector control valve means to be moved simultaneously.

8. In a control system having a selector valve means for selectively engaging a multi-speed transmission in each selected condition of operation by separate drive establishing means, separate means, including at least one valve spool, communicating fluid past said valve spool and to said selector valve means directly for independently modulating the fluid pressure rise in one drive establishing means at a rate different from the fluid pressure rise in the other drive establishing means.

9. In a multi-speed transmission having a torque converter operatively connected to be engaged selectively therein in a first drive by a first drive establishing means, a second drive establishing means to engage said multi-speed transmission in a second drive without said torque converter engaged therein and control means, including at least one valve spool, communicating fluid past said valve spool to both said first and second drive establishing means directly for actuating said first and second drive establishing means and for automatically modulating the rise of fluid pressure to said first drive establishing means to a maximum pressure level higher than to said second drive establishing means.

10. A multi-speed transmission including load and rear drive establishing means, and control system combination, said control system comprising selector control valve means for communicating fluid pressure to said multi-speed transmission to engage it in a reverse, neutral or forward speed condition of operation and a pressure control valve means for modulating fluid pressure rise to said multi-speed transmission when it is engaged in a selected condition of operation and a safety signal means communicating said selector and pressure control valve means for preventing said fluid pressure from being communicated to the load and rear drive establishing means of said multi-speed transmission when it is pressurized initially in a condition of operation other than neutral.

11. The invention of claim 10 wherein said pressure control valve means comprises means for communicating fluid pressure from said pressure to said selector control valve means continuously when said multi-speed transmission is shifted from one condition of operation to another, after said multi-speed transmission has been engaged initially in its neutral condition of operation.

12. In a transmission drive train comprising a multi-speed transmission and a hydrodynamic retarder having a rotor mechanically connected therein, control means for shifting said multi-speed transmission from one condition of operation to another and means for deactivating said hydrodynamic retarder automatically when said multi-speed transmission is shifted from one condition of operation to another.

13. In a transmission drive train, a hydrodynamic retarder, a torque converter, a heat exchanger operatively connected to be communicated selectively to said hydrodynamic retarder and said torque converter and control valve means to communicate the heat exchanger with the torque converter and hydrodynamic retarder, said control valve means comprising means for lubricating said hydrodynamic retarder when said heat exchanger is communicated with said torque converter.

14. A transmission drive train, a hydrodynamic retarder and return said fluid in a closed loop system back tively in said drive train, a heat exchanger operatively connected to receive fluid from said hydrodynamic retarder and return said fluid n a closed loop system back to said hydrodynamic retarder, a torque converter operatively connected to be engaged selectively in said transmission drive train and control valve means operatively connected to be actuated to permit a portion of the fluid contained in said loop system to be communicated to a conduit means while at the same time permitting a substantially equal amount of fluid to be communicated to said hydrodynamic retarder by said torque converter whereby the fluid in said loop system is maintained substantially constant.

15. In a transmission drive train, a torque converter, a hydrodynamic retarder operatively connected to said torque converter, and control valve means for communicating fluid pressure to said hydrodynamic retarder from said torque converter directly and for automatically regulating fluid pressure in said torque converter and said retarder simultaneously.

16. The invention of claim 15 wherein said transmission drive train further comprises a multi-speed gear assembly operatively connected in said drive train to be shifted into different conditions of operation and further comprising means for actuating said control valve means to inactivate said hydrodynamic retarder when said multi-speed gear assembly is shifted.

17. In a transmission drive train, a hydrodynamic retarder having inlet means and outlet means, and control valve means for selectively communicating working fluid to said retarder from said inlet means, said control valve means comprising a housing, a spool slidably mounted in said housing and means formed in said control valve means and through said spool member for communicating said inlet and outlet means for regulating fluid pressure in said retarder.

18. The invention of claim 17 further comprising a torque converter having an outlet for communicating working fluid to the inlet means of said hydrodynamic retarder.

19. The invention of claim 18 further comprising pressure modulating valve means operatively connected to said torque converter for controlling fluid pressure to said torque converter.

20. The invention of claim 17 further comprising a multi-speed transmission operatively connected to a pressurized fluid source to have fluid pressure communicated thereto to effect a selected speed of operation and further connected to said hydrodynamic retarder to be retarded selectively by said hydrodynamic retarder.

21. In a multi-speed transmission having first and second drive establishing means, a pressure control valve comprising first and second independent modulating means operatively connected to said first and second drive establishing means respectively, each of said modulating means comprising valve means opposed in its movement by a load piston means, spring means between said valve means and said load piston and means communicating fluid behind each load piston to move each of said modulating means to a modulating position for automatically effecting separate fluid pressure modulation through each of said valve means, said modulated fluid pressures communicating with said first and second drive establishing means past only one of said valve means.

22. The invention of claim 21 wherein said first modulating means comprises a pressure modulating relief valve and said second modulating means comprises a pressure modulating reducing valve.

23. The invention of claim 21 wherein said first modulating means further comprises load piston relief valve means responsive to fluid pressure communicated to a drive establishing means of a multi-speed transmission to control the movements of one of said load piston means.

24. The invention of claim 23 further comprising sequence valve means communicating with said load piston relief valve means for aiding in controlling the movements of said last-mentioned load piston means.

25. The invention of claim 21 further comprising selector control valve means, said selector control valve means comprising safety reset passage means formed therein communicating in one condition of selector control valve operation with means in said pressure control valve for preventing fluid from passing through said pressure control valve.

26. In a transmission drive train, a hydrodynamic retarder, retarder control valve means for communicating fluid pressure to and out of said hydrodynamic retarder to control the torque absorbing capacity thereof and resilient input means for controlling the actuation of said retarder control valve means, said retarder control valve means comprising means for overriding said resilient input means to actuate said control valve means for automatically regulating the fluid pressure in said retarder.

27. In a transmission drive train, a drive establishing means, a first pressure modulating valve means to automatically control a first modulated fluid pressure in said drive establishing means, a torque converter, a second pressure modulating valve means to automatically control and maintain a second modulated fluid pressure in said torque converter at a pressure level less than the pressure level of said first fluid pressure.

28. The invention of claim 27 wherein said first pressure modulating valve means is operatively connected to charge said drive establishing means to the maximum level of said first fluid pressure before said second pressure modulating valve means charges said torque converter to the madimum level of said second fluid pressure.

References Cited

UNITED STATES PATENTS

| | | | |
|---|---|---|---|
| 2,309,051 | 1/1943 | Dodge. | |
| 3,105,393 | 10/1963 | Weinrich | 192—4 X |
| 3,128,642 | 4/1964 | Fisher, et al. | 192—4 X |
| 3,311,200 | 3/1967 | Hayward | 74—688 X |
| 3,319,746 | 5/1967 | Christenson, et al. | 192—4 |
| 2,727,601 | 12/1955 | Shurts | 192—4 X |
| 2,934,976 | 5/1960 | Herndon | 192—3.23 X |
| 2,946,416 | 7/1960 | Snoy | 192—4 |
| 3,003,606 | 10/1961 | Hindmarch | 192—4 |
| 3,202,018 | 8/1965 | Hilpert. | |
| 3,259,218 | 7/1966 | Black et al. | 192—3.5 |
| 3,265,169 | 8/1966 | Ashauer | 192—3.33 |
| 3,324,979 | 6/1967 | Hilpert et al. | 192—3.5 |
| 3,348,644 | 10/1967 | Hilpert | 192—4 |

FRED C. MATTERN, Jr., *Primary Examiner.*

ARTHUR T. McKEON, *Examiner.*

UNITED STATES PATENT OFFICE
CERTIFICATE OF CORRECTION

Patent No. 3,386,540                                     June 4, 1968

Joachim Horsch et al.

It is certified that error appears in the above identified patent and that said Letters Patent are hereby corrected as shown below:

Column 1, line 23, after "and" insert -- the --. Column 6, line 43, after "and" insert -- check --. Column 8, line 23, "duel" should read -- dual --. Column 9, line 67, "in" should read -- is --. Column 10, line 26, "74" should read -- 64 --. Column 12, line 16, "coresponding" should read -- corresponding --. Column 16, lines 48 and 49, "and return said fluid in a closed loop system back tively" should read -- operatively connected therein to be engaged selectively --; line 51, "fluid n" should read -- fluid in --.

Signed and sealed this 17th day of February 1970.

(SEAL)
Attest:

Edward M. Fletcher, Jr.                          WILLIAM E. SCHUYLER, JR.
Attesting Officer                                        Commissioner of Patents